United States Patent [19]

Lewis

[11] Patent Number: 4,529,073
[45] Date of Patent: Jul. 16, 1985

[54] COOLING OIL CUT-OFF VALVE FOR A CLUTCH

[75] Inventor: David G. Lewis, Cedar Falls, Iowa
[73] Assignee: Deere & Company, Moline, Ill.
[21] Appl. No.: 429,741
[22] Filed: Sep. 30, 1982
[51] Int. Cl.³ .................. F16D 13/72; F16D 13/74; F16D 25/063; F16D 25/061
[52] U.S. Cl. .................. 192/70.12; 192/85 AA; 192/113 B
[58] Field of Search ........... 192/85 AA, 70.12, 113 B

[56] References Cited

U.S. PATENT DOCUMENTS

| | | | |
|---|---|---|---|
| 2,723,567 | 11/1955 | Double et al. | 192/85 AA X |
| 2,771,976 | 11/1956 | Smirl. | |
| 3,166,165 | 1/1965 | Anderson et al. | |
| 3,647,037 | 3/1972 | Toma | 192/106 F |
| 3,926,288 | 12/1975 | Nerstad | 192/104 F |
| 4,006,808 | 2/1977 | Starling et al. | 192/103 FA |
| 4,308,940 | 1/1982 | Cadee | 192/70.12 X |
| 4,318,311 | 3/1982 | Ross | 74/752 C |
| 4,321,990 | 3/1982 | Koch, Jr. | 192/113 B X |
| 4,361,217 | 11/1982 | Bieber et al. | 192/85 AA X |

FOREIGN PATENT DOCUMENTS 0644173 10/1950 United Kingdom .
1273859 5/1972 United Kingdom .

Primary Examiner—Rodney H. Bonck
Assistant Examiner—David D. House

[57] ABSTRACT

A cooling oil cut-off valve is disclosed for use in a clutch having a rotatable drum fixed to a drive member and a rotatable hub fixed to a driven member. The hub is arranged within the drum so as to form a clutch chamber in which is positioned a clutch pack. The clutch pack is radially attached to both the drum and the hub and is axially engageable by a hydraulically actuated piston. Fluid flow to the piston is provided by means of a first fluid passage while the flow of cooling oil to the clutch chamber is provided by a second fluid passage. The clutch drum also contains a bore formed therein which intersects the first and second passages and which contains a cooling oil cut-off valve. The cooling oil cut-off valve is movable by fluid pressure to a first position when the clutch is engaged to permit cooling oil to flow to the clutch pack. The cut-off valve is also movable to a second position by centrifugal force which is generated by the rotational movement of the clutch drum to prevent the flow of cooling oil to the clutch pack when the clutch is disengaged. The cooling oil cut-off valve is designed to initially start moving toward the open position at a higher pressure than needed to keep it moving toward said open position.

11 Claims, 2 Drawing Figures

COOLING OIL CUT-OFF VALVE FOR A CLUTCH

FIELD OF THE INVENTION

This invention relates to a centrifugally actuated cooling oil cut-off valve for regulating the flow of cooling oil to a clutch.

BACKGROUND OF THE INVENTION

Frictional clutches, such as those used in motorized vehicles, tend to generate an enormous amount of heat when their clutch packs are engaged. In order to dissipate this generated heat, cooling oil is routed to the clutch chamber at relatively low pressure. During the disengagement process however, it is advantageous to minimize the amount of cooling oil which is retained in the clutch chamber so as to reduce the drag on the clutch and thereby improve its overall efficiency. Traditionally, control of the flow of cooling oil to the clutch has been accomplished by the use of spring operated poppet or spool valves. The disadvantages of using such valves is that they require a plurality of components, they necessitate the costly machining of valve bores and seats, and their physical appearance requires an increase in the overall diameter and/or length of the clutch.

Now a centrifugally actuated cooling oil cut-off valve has been invented which overcomes the disadvantages and deficiencies of the prior art.

SUMMARY OF THE INVENTION

Briefly, this invention relates to a cooling oil cut-off valve for a clutch. The clutch includes a rotatable drum fixed to a drive member and a rotatable hub which is fixed to a driven member. The hub is arranged within the drum so as to form a clutch chamber. Within this clutch chamber is positioned a clutch pack which is radially attached to both the drum and the hub and which is axially engageable by a hydraulically actuated piston. Pressurized fluid is routed to one side of the piston through a first passage while cooling oil is routed to the clutch chamber through a second passage. Intersecting both the first and the second passages is a bore radially aligned to the rotational axis of the clutch. Positioned within this bore is a cooling oil cut-off valve which is movable to a first position by the presence of hydraulic pressure in the first passage. In the first position, wherein the clutch is engaged, the valve permits a flow of cooling oil to the clutch chamber. The valve is also movable to a second position by the centrifugal force of the rotating clutch such that the flow of cooling oil to the clutch chamber is prevented when the clutch is disengaged. The cooling oil cut-off valve is designed such that it will initially start to move towards its first position under the influence of a greater pressure value than needed to keep it moving towards its first position.

The general object of this invention is to provide a centrifugally actuated cooling oil cut-off valve for a clutch. A more specific object of this invention is to provide a cooling oil cut-off valve for a clutch which operates at low pressure.

Another object of this invention is to provide a cooling oil cut-off valve for a clutch which is simple in construction and economical to manufacture.

Still another object of this invention is to provide a cooling oil cut-off valve which is a single member and requires less maintenance during the life of the clutch.

Still further, an object of this invention is to provide a cooling oil cut-off valve for a clutch which minimizes the amount of space needed within the clutch.

Other objects and advantages of the present invention will become more apparent to those skilled in the art in view of the following description and the accompanying drawings.

DETAILED DESCRIPTION OF THE PREFERRED EMBODIMENT

Figure 1:
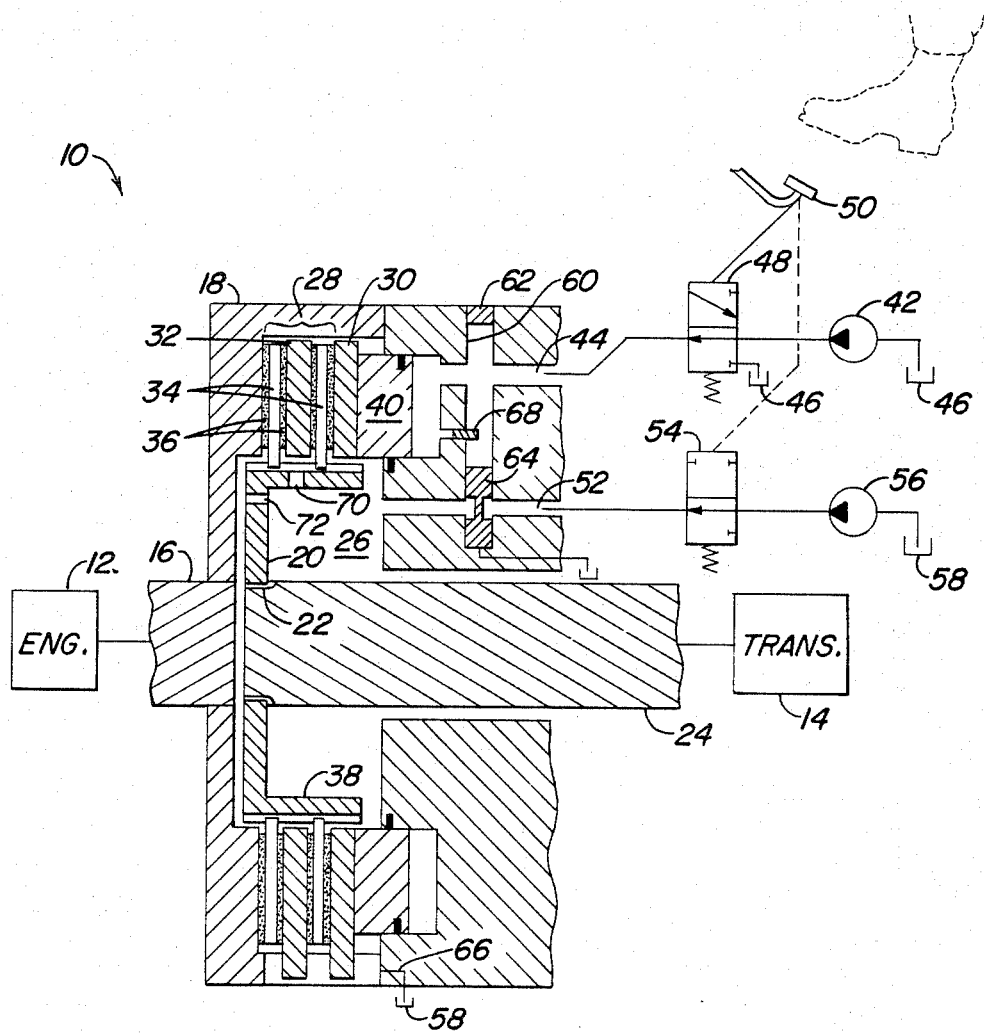
FIG. 1 is a partial sectional view of a clutch showing the cooling oil cut-off valve in a first position permitting the flow of cooling oil to the clutch chamber.
Figure 2:
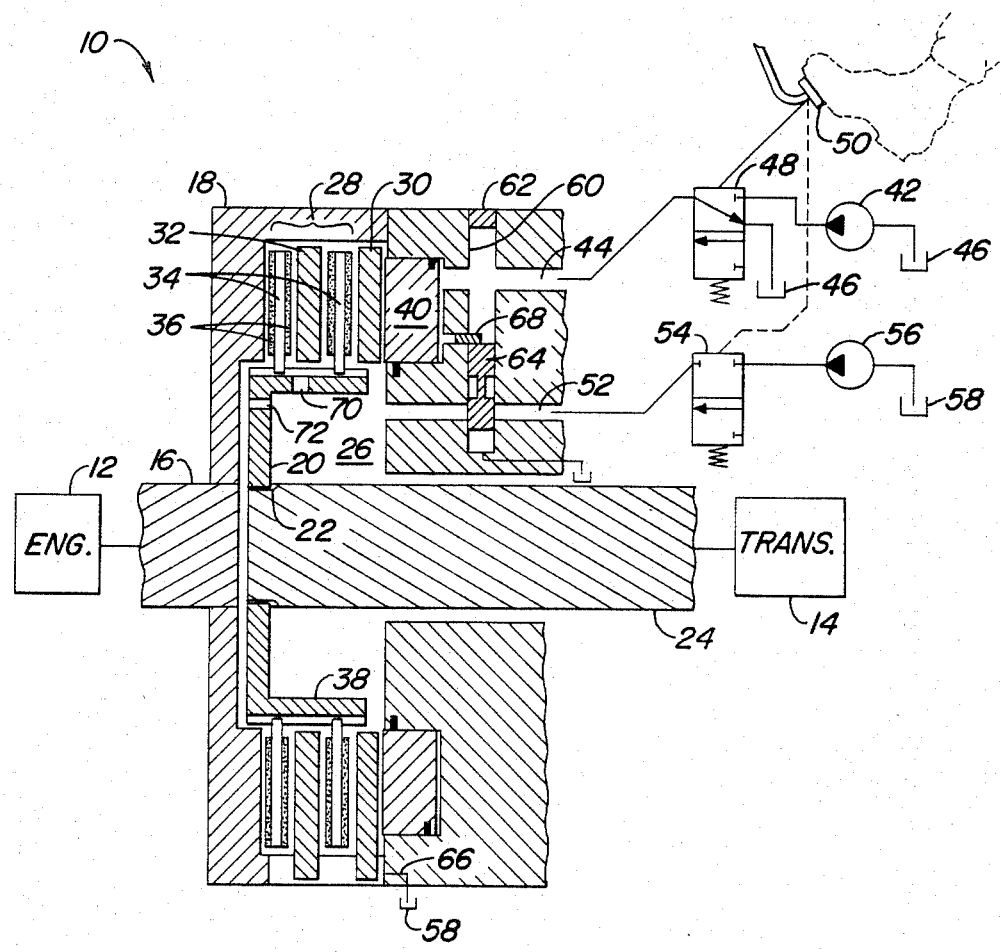
FIG. 2 is a view similar to FIG. 1 except that the cooling oil cut-off valve is moved to a second position blocking the flow of cooling oil to the clutch chamber.

Referring to FIGS. 1 and 2, a clutch assembly 10 is shown connected between an engine 12 and a transmission 14. The engine 12 is physically attached by an input shaft 16 to a rotatable clutch drum 18. The drum 18 is configured to have a hollow interior into which is fitted a clutch hub 20 which is splined at 22 to an output shaft 24. The output shaft 24 in turn is connected to the transmission 14. The clutch drum 18 and the clutch hub 22 cooperate to form a clutch chamber 26 in which is positioned a clutch pack 28. The clucth pack 28 consists of a pressure plate 30, one or more driving plates 32, and one or more driven plates 34. The pressure plate 30 and driving plate(s) 32 are radially fixed to the clutch drum 18 but are capable of moving axially relative to each other. The driven plate(s) 34, which contain frictional liners 36 on their outer surfaces, are attached to an outer sleeve portion 38 of the clutch hub 20 and, like the driving plates 32, are capable of moving axially relative to one another.

The clutch assembly 10 also includes a movable hydraulically actuated piston 40 which is positioned within a portion of the clutch drum 18 such that it is coaxially aligned with the clutch pack 28. Pressurized fluid, which is used to activate the piston 40, is supplied by a first pump 42 through a first fluid passage 44. The pump 42 pressurizes the fluid from a fluid reservoir 46 and supplies it to a first valve 48 which regulates the flow of hydraulic fluid through the passage 44. The valve 48 is mechanically actuated by movement of a clutch pedal 50 which is located in the operator's station of the vehicle. In FIG. 1, the clutch pedal 50 is not depressed and the valve 48 is in a position permitting flow of fluid from the pump 42 through the first passage 44 to one side of the piston 40. When the clutch pedal 50 is depressed, the valve 48 is moved such that the fluid in the first passage 44 is permitted to be drained out to the reservoir 46.

The clutch assembly 10 also includes a second fluid passage 52 which is connected via a second valve 54 to a second pump 56. The second pump 56 in turn is connected to a cooling oil reservoir 58 such that cooling oil can be supplied to the clutch chamber 26. For clarity sake, the reservoirs 46 and 58 are shown as separate elements but it should be noted that when one type of oil is used which can both activate the piston 40 and cool the clutch pack 28, only one reservoir is needed. A bore 60 is formed within the clutch drum 18 and is radially aligned relative to the rotational axis of the clutch drum 18. The bore 60 intersects both the first and the second passages 44 and 52, respectively, and is closed at both ends. Preferably, the bore 60 can be drilled into the clutch drum 18 and then capped such as by a plug 62.

Positioned within the bore 60 is a cooling oil cut-off valve 64 which is movable between an open and a closed position. The cooling oil cut-off valve 64, which is preferably a spool valve, is shown in FIG. 1 as being in an open position wherein fluid passing from the pump 56 and the second valve 54 is permitted to flow into the clutch chamber 26. In FIG. 2, the cooling oil cut-off valve 64 is shown in a closed position, blocking the flow of fluid through the second passage 52.

Referring again to FIG. 1, as the pressurized fluid passes from the pump 42 through the valve 48 and into the first passage 44, the pressure within the first passage 44 will increase from a nominal low value of roughly 5 to 15 psi to a value of about 45 to 50 psi. This increase in pressure will cause the piston 40 to move to its left while simultaneously causing the cooling oil cut-off valve 64 to move radially inward. As the cut-off valve 64 moves inward, its radius of rotation as measured from the central axis of the clutch drum 18, is reduced thereby reducing the centrifugal force which is forcing it outward. This means that the initial force needed to start moving the cooling cut-off valve inward is greater than the force needed to keep it moving towards its first or open position. This movement of the cooling cut-off valve 64 inward to a first position permits the flow of cooling oil through the second passage 52 to the clutch chamber 26. This movement of the cooling oil cut-off valve 64 assures that cooling oil will be available to dissipate the heat generated as the piston 40 continues to press the members of the clutch pack 28 together. Preferably, the cooling oil will be present in the clutch chamber 26 before or at the same time as the elements of the clutch pack start to engage. For a typical clutch, the engagement pressures could reach a value of approximately 250 pounds per square inch.

With the clutch pack 28 in the engaged position, power is transferred from the engine 12 via the input shaft 16, the clutch drum 18 and the output shaft 24 to the transmission 14. It should be noted that, as shown schematically in FIG. 1, the second valve 54 is operatively connected to the foot pedal 50. By such a connection, the second valve 54 can be actuated between an open and a closed position such as to regulate the flow through the second passage 52. Although this is but one way of supplying cooling oil to the clutch assembly 10, it will be known to those skilled in the art that other means can be used to obtain the same purpose. For example, since the cooling oil is supplied to the second passage 52 at a relatively low pressure of approximately 45 to 50 psi, it is possible for one to use a variable displacement pump in place of the fixed pump 56.

When the operator of the vehicle wishes to change the gear ratios within the transmission, he will depress the clutch pedal 50 thereby shifting the first valve 48 to a position such that the pressurized fluid in the first passage 44 is allowed to drain to the reservoir 46. As this fluid drains to the reservoir 46, the piston 40 will move to its right thereby allowing the members of the clutch pack 28 to separate. As the pressure within the first passage 44 decreases, the centrifugal force generated by the rotational movement of the clutch drum 18 will cause the cooling oil cut-off valve 64 to move upward to its second or closed position as shown in FIG. 2. It should be noted that upon clutch disengagement the fluid force resisting outward movement of the cooling oil cut-off valve 64 diminishes quickly and as this is the only force resisting such movement, the centrifugal force applied to the valve 64 will easily move it outward.

Once the cooling oil cut-off valve 64 is in its closed position (positioned radially outward relative to the central axis of the clutch drum 18 as shown in FIG. 2), the oil within the clutch chamber 26 is allowed to move outward by the centrifugal force generated by the rotation of the clutch drum 18. This oil is allowed to pass back into the reservoir 58 via a conduit 66. By reducing the amount of cooling oil contained in the clutch chamber 26, one is able to reduce the drag on the members of the clutch pack 28 and therefore improve the overall efficiency of the clutch assembly 10.

As shown in the Figures, a pin 68 is positioned in the clutch drum 18 such that it intersects the bore 60 and can limit the overall travel of the cooling oil cut-off valve 64. The exact amount of movement of the cut-off valve 64 will be dependent upon a number of factors including: the mass of the valve, the weight of the valve, the configuration of the valve, the radial distance the valve is located from the central axis of the clutch drum 18, etc. These exact parameters will be determined by the particular size and design of the clutch assembly 10 one wishes to employ. Also evident in the Figures are oil passages 70 and 72 formed in the clutch hub 20 which assists in facilitating the outward movement of the cooling oil from the interior of the clutch drum 28 to the outer periphery of the clutch chamber 26. These passages, 70 and 72, are optional and do not affect the operation of the cooling oil cut-off valve 64.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A cooling oil cut-off valve for a clutch, said clutch having a rotatable drum fixed to a drive member, a rotatable hub fixed to a driven member which is arranged within said drum to form a clutch chamber, a clutch pack positioned in said clutch chamber which is radially attached to both said drum and said hub and which is axially engageable by a hydraulically actuated piston, a first fluid passage formed in said drum for supplying fluid to a side of said piston, which side is distal from said clutch pack, a second fluid passage formed in said drum radially inwardly of said first fluid passage for supplying a cooling medium to said clutch chamber, and a bore radially aligned to the rotational axis of said clutch and which intersects both said first and second fluid passages, said cut-off valve comprising a spool valve positioned in said bore which is movable to a first position by fluid pressure in said first fluid passage wherein flow of said cooling medium through said second fluid passage is permitted and which is movable to a second position by centrifugal force generated by the rotational speed of said clutch drum to prevent flow of said cooling medium to said clutch chamber.

2. The cooling oil cut-off valve of claim 1 wherein said spool valve is movable to said first position at fluid pressures less than the fluid pressure utilized to fully engage the clutch pack.

3. The cooling oil cut-off valve of claim 2 wherein said spool valve is movable to said first position by fluid pressure under 50 psi.

4. The cooling oil cut-off valve of claim 1 wherein a pressure rise in said first fluid passage, above a predetermined value, causes both engagement of said clutch and movement of said spool valve to said first position.

5. The cooling oil cut-off valve of claim 4 wherein a pin protrudes into said bore to limit the overall travel of said spool valve.

6. The cooling oil cut-off valve of claim 1 wherein at a given speed the fluid pressure needed to initially start moving said spool valve toward said first position is greater than the force needed to keep said spool valve moving toward said first position.

7. The cooling oil cut-off valve of claim 1 wherein said spool valve is aligned perpendicular to the movable direction of said clutch pack.

8. A clutch assembly comprising: a clutch having a rotatable drum fixed to a drive member, a rotatable hub fixed to a driven member and arranged within said drum to form a clutch chamber, a clutch pack positioned in said clutch chamber which is radially attached to both said drum and said hub and which is axially engageable by a hydraulically actuated piston, a first fluid passage formed in said drum for supplying hydraulic fluid to a side of said piston, which side is distal from said clutch pack, a second fluid passage formed in said drum for supplying cooling oil to said clutch chamber, a bore radially aligned to the rotational axis of said clutch and which intersects both said first and second fluid passages, and a cooling oil cut-off valve positioned in said bore which is movable to a first position by hydraulic fluid pressure of a predetermined valve present in said first passage to permit flow of said cooling oil to said clutch chamber and which is movable to a second position by centrifugal force generated by the rotational speed of said clutch drum, when said pressure is less than said predetermined value.

9. The clutch assembly of claim 8 wherein said cooling oil cut-off valve is a spool valve.

10. The clutch assembly of claim 8 wherein movement of said cooling oil cut-off valve to said first position is inward toward the rotational axis of said clutch drum.

11. A clutch assembly comprising: a clutch having a rotatable drum fixed to a drive member, a rotatable hub fixed to a driven member and arranged within said drum to form a clutch chamber, a clutch pack positioned in said clutch chamber which is radially attached to both said drum and said hub and which is axially engageable by a hydraulically actuated piston, a first fluid passage formed in said drum for supplying hydraulic fluid to a side of said piston, which side is distal from said clutch pack, a second fluid passage formed in said drum for supplying cooling oil to said clutch chamber, a bore radially aligned to the rotational axis of said clutch and which interacts both said first and second passages, and a cooling oil cut-off valve positioned in said bore which is movable to a first position by a predetermined hydraulic fluid pressure present in said first passage to permit flow of said cooling oil to said clutch chamber and which is movable to a second position by centrifugal force generated by the rotational speed of said clutch drum when said presure is less than said predetermined fluid pressure, wherein the fluid pressure needed to initially start moving said spool valve toward said first position is greater than the force needed to keep said spool valve moving toward said first position.

* * * * *

UNITED STATES PATENT AND TRADEMARK OFFICE
CERTIFICATE OF CORRECTION

PATENT NO. : 4,529,073
DATED : 16 July 1985
INVENTOR(S) : David G. Lewis

It is certified that error appears in the above-identified patent and that said Letters Patent is hereby corrected as shown below:

Column 5, line 34, delete "valve" and insert -- value -- . Column 6, line 23, delete "interacts and insert -- intersects. Column 6, line 23, after "second" insert -- fluid -- .

Signed and Sealed this

Twenty-first Day of January 1986

[SEAL]

Attest:

DONALD J. QUIGG

Attesting Officer

Commissioner of Patents and Trademarks